(12) United States Patent
MacKay et al.

(10) Patent No.: US 11,392,151 B2
(45) Date of Patent: Jul. 19, 2022

(54) DUAL-LEVEL DETECTION TO REDUCE VOLTAGE DROOP ON CRITICAL BATTERY VOLTAGE NODES

(71) Applicant: Cirrus Logic International Semiconductor Ltd., Edinburgh (GB)

(72) Inventors: Graeme G. MacKay, Austin, TX (US); Ajit Sharma, Austin, TX (US); Jason W. Lawrence, Austin, TX (US); Qiang Li, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/171,782

(22) Filed: Feb. 9, 2021

(65) Prior Publication Data
US 2022/0035389 A1    Feb. 3, 2022

Related U.S. Application Data

(60) Provisional application No. 63/058,018, filed on Jul. 29, 2020.

(51) Int. Cl.
| | | |
|---|---|---|
| G05F 1/00 | (2006.01) | |
| G05F 1/46 | (2006.01) | |
| H02J 7/00 | (2006.01) | |

(52) U.S. Cl.
CPC .............. *G05F 1/46* (2013.01); *H02J 7/0063* (2013.01)

(58) Field of Classification Search
CPC .......... H02J 3/14; H02J 1/14; H02M 3/33561; H02M 2001/009; Y02B 70/3225
USPC .............................................. 307/81; 323/284
See application file for complete search history.

(56) References Cited

U.S. PATENT DOCUMENTS

| | | | |
|---|---|---|---|
| 10,720,835 B2 | 7/2020 | King et al. | |
| 10,734,885 B2 | 8/2020 | King et al. | |
| 2005/0264268 A1* | 12/2005 | Ueno | H02J 2207/20 323/211 |
| 2012/0268094 A1* | 10/2012 | Scaldaferri | H02M 3/156 323/284 |

(Continued)

FOREIGN PATENT DOCUMENTS

GB         2302770 A       1/1997

OTHER PUBLICATIONS

Combined Search and Examination Report under Sections 17 and 18(3), UKIPO, Application No. GB2109416.4, dated Dec. 9, 2021.

*Primary Examiner* — Quan Tra
(74) *Attorney, Agent, or Firm* — Jackson Walker L.L.P.

(57) ABSTRACT

A power delivery system may include a power converter configured to electrically couple to a power source and further configured to supply electrical energy to one or more loads electrically coupled to an output of the power converter and control circuitry configured to determine whether a voltage node in the power delivery system has fallen below a warning threshold voltage, determine whether the voltage node has fallen below a critical threshold voltage, wherein the critical threshold voltage is lesser than the warning threshold voltage, in response to a voltage of the voltage node falling below the warning threshold voltage, decrease a maximum current drawn by the power converter from a first current level to a second current level, and in response to a voltage of the voltage node falling below the critical threshold voltage, decrease a maximum current drawn by the power converter from the second current level to a third current level.

24 Claims, 12 Drawing Sheets

(56) References Cited

U.S. PATENT DOCUMENTS

2014/0047248 A1 2/2014 Heo et al.
2019/0181754 A1 6/2019 Ash et al.

* cited by examiner

DUAL-LEVEL DETECTION TO REDUCE VOLTAGE DROOP ON CRITICAL BATTERY VOLTAGE NODES

RELATED APPLICATION

The present disclosure claims priority to U.S. Provisional Patent Application Ser. No. 63/058,018, filed Jul. 29, 2020, which is incorporated by reference herein in its entirety.

FIELD OF DISCLOSURE

The present disclosure relates in general to circuits for electronic devices, including without limitation personal portable devices such as wireless telephones and media players, and more specifically, to limiting current in a power converter.

BACKGROUND

Portable electronic devices, including wireless telephones, such as mobile/cellular telephones, tablets, cordless telephones, mp3 players, and other consumer devices, are in widespread use. Such a portable electronic device may include circuitry for implementing a power converter for converting a battery voltage (e.g., provided by a lithium-ion battery) into a supply voltage delivered to one or more components of the portable electronic device. The power delivery network may also regulate such supply voltage and isolate the downstream loads of these one or more components from fluctuation in an output voltage of the battery over the course of operation.

In addition to regulating the supply rail for the supply voltage, it may be desirable for the power converter (or a control circuit for the power converter) to provide for active protection mechanisms to limit an amount of current that can be drawn by the one or more components powered from the supply rail.

SUMMARY

In accordance with the teachings of the present disclosure, one or more disadvantages and problems associated with existing approaches to operating a power converter may be reduced or eliminated.

In accordance with embodiments of the present disclosure, a power delivery system may include a power converter configured to electrically couple to a power source and further configured to supply electrical energy to one or more loads electrically coupled to an output of the power converter and control circuitry configured to determine whether a voltage node in the power delivery system has fallen below a warning threshold voltage, determine whether the voltage node has fallen below a critical threshold voltage, wherein the critical threshold voltage is lesser than the warning threshold voltage, in response to a voltage of the voltage node falling below the warning threshold voltage, decrease a maximum current drawn by the power converter from a first current level to a second current level, and in response to a voltage of the voltage node falling below the critical threshold voltage, decrease a maximum current drawn by the power converter from the second current level to a third current level.

In accordance with these and other embodiments of the present disclosure, a method may be used in a power delivery system having a power converter configured to electrically couple to a power source and further configured to supply electrical energy to one or more loads electrically coupled to an output of the power converter. The method may include determining whether a voltage node in the power delivery system has fallen below a warning threshold voltage, determining whether the voltage node has fallen below a critical threshold voltage, wherein the critical threshold voltage is lesser than the warning threshold voltage, in response to a voltage of the voltage node falling below the warning threshold voltage, decreasing a maximum current drawn by the power converter from a first current level to a second current level, and in response to a voltage of the voltage node falling below the critical threshold voltage, decreasing a maximum current drawn by the power converter from the second current level to a third current level.

In accordance with these and other embodiments of the present disclosure, a mobile device may include a power source, one or more loads, a power converter electrically coupled to the power source and further configured to supply electrical energy to the one or more loads, and control circuitry. The control circuitry may be configured to determine whether a voltage node in the power delivery system has fallen below a warning threshold voltage, determine whether the voltage node has fallen below a critical threshold voltage, wherein the critical threshold voltage is lesser than the warning threshold voltage, in response to a voltage of the voltage node falling below the warning threshold voltage, decrease a maximum current drawn by the power converter from a first current level to a second current level, and in response to a voltage of the voltage node falling below the critical threshold voltage, decrease a maximum current drawn by the power converter from the second current level to a third current level.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
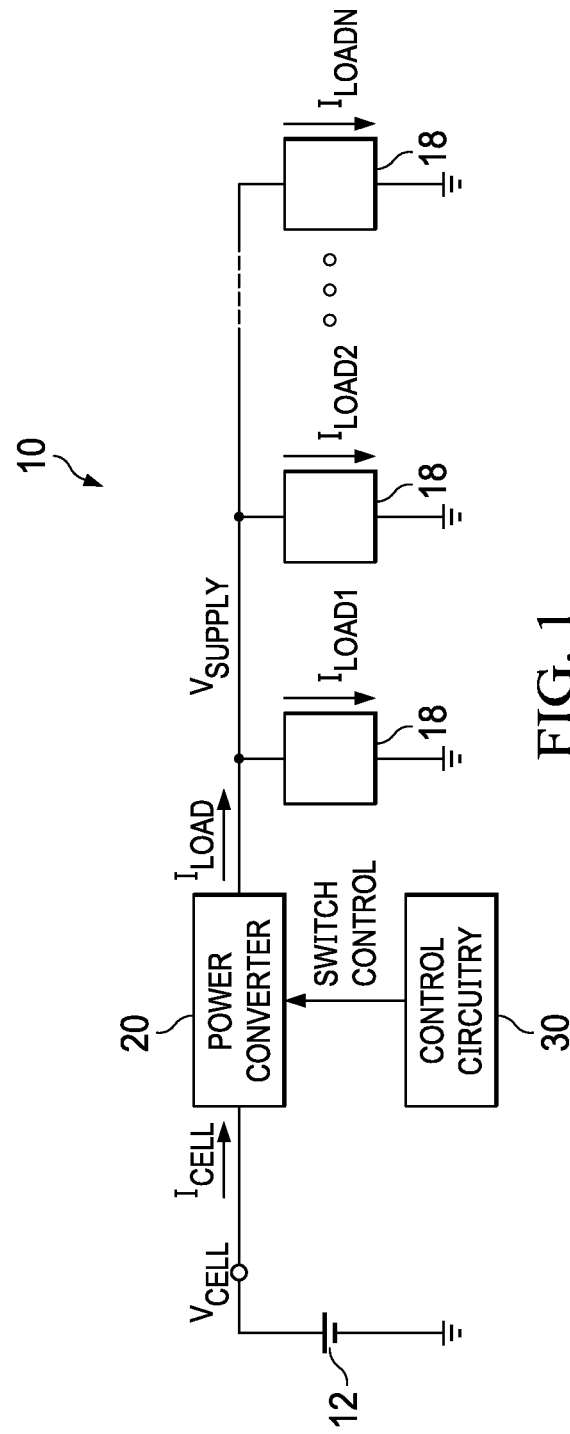
FIG. 1 illustrates a block diagram of selected components of an example power delivery network, in accordance with embodiments of the present disclosure.

FIG. 1 illustrates a block diagram of selected components of an example power delivery network 10, in accordance with embodiments of the present disclosure. In some embodiments, power delivery network 10 may be implemented within a portable electronic device, such as a smart phone, tablet, game controller, and/or other suitable device.

As shown in FIG. 1, power delivery network 10 may include a battery 12 and a power converter 20 configured to convert a battery voltage $V_{CELL}$ generated by battery 12 into a supply voltage $V_{SUPPLY}$ used to power a plurality of downstream components 18, wherein each downstream component 18 may draw a respective current $I_{LOAD1}$, $I_{LOAD2}$, $I_{LOAD3}$, etc., from the output of power converter 20, meaning an aggregate load current $I_{LOAD} = I_{LOAD1} + I_{LOAD2} + \ldots + I_{LOADN}$ may be generated by power converter 20. Power converter 20 may be implemented using a boost converter, buck converter, buck-boost converter, transformer, charge pump, and/or any other suitable power converter. Downstream components 18 of power delivery network 10 may include any suitable functional circuits or devices of power delivery network 10, including without limitation other power converters, processors, audio coder/decoders, amplifiers, display devices, etc.

As shown in FIG. 1, power delivery network 10 may also include control circuitry 30 for controlling operation of power converter 20, including switching and commutation of switches internal to power converter 20. In addition, as described in greater detail below, control circuitry 30 may also implement active protection mechanisms for limiting current $I_{CELL}$ drawn from battery 12.

Figure 2:
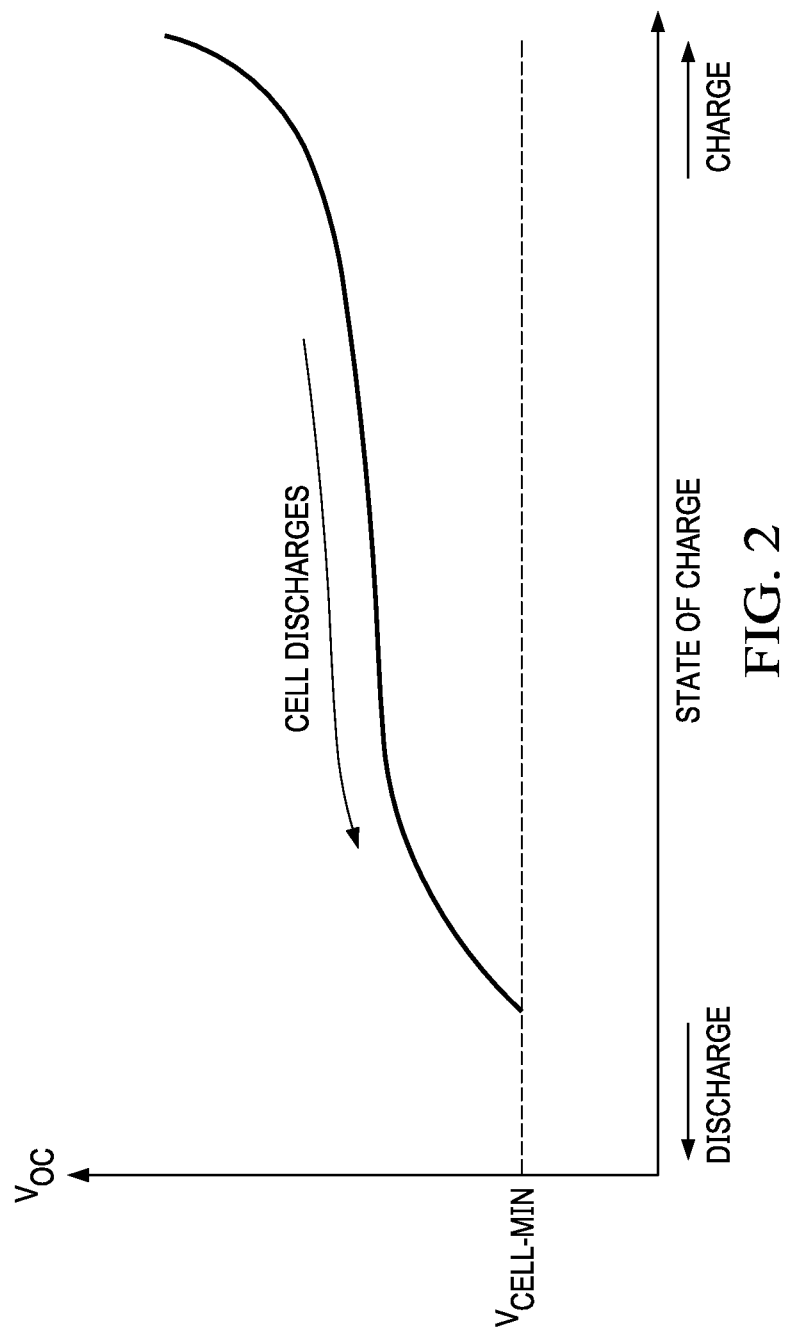
FIG. 2 illustrates an example graph of an open circuit voltage of a battery versus the battery's state of charge, in accordance with embodiments of the present disclosure.

Lithium-ion batteries are typically known to operate from 4.2 V down to 3.0 V, known as an open circuit voltage $V_{OC}$ of the battery (e.g., battery 12). As a battery discharges due to a current drawn from the battery, the state of charge of the battery may also decrease, and open circuit voltage $V_{OC}$ (which may be a function of state of charge) may also decrease as a result of electrochemical reactions taking place within the battery, as shown in FIG. 2. Outside the range of 3.0 V and 4.2 V for open circuit voltage $V_{OC}$, the capacity, life, and safety of a lithium-ion battery may degrade. For example, at approximately 3.0 V, approximately 95% of the energy in a lithium-ion cell may be spent (i.e., state of charge is 5%), and open circuit voltage $V_{OC}$ would be liable to drop rapidly if further discharge were to continue. Below approximately 2.4V, metal plates of a lithium-ion battery may erode, which may cause higher internal impedance for the battery, lower capacity, and potential short circuit. Thus, to protect a battery (e.g., battery 12) from over-discharging, many portable electronic devices may prevent operation below a predetermined end-of-discharge voltage $V_{CELL-MIN}$.

Figure 3:
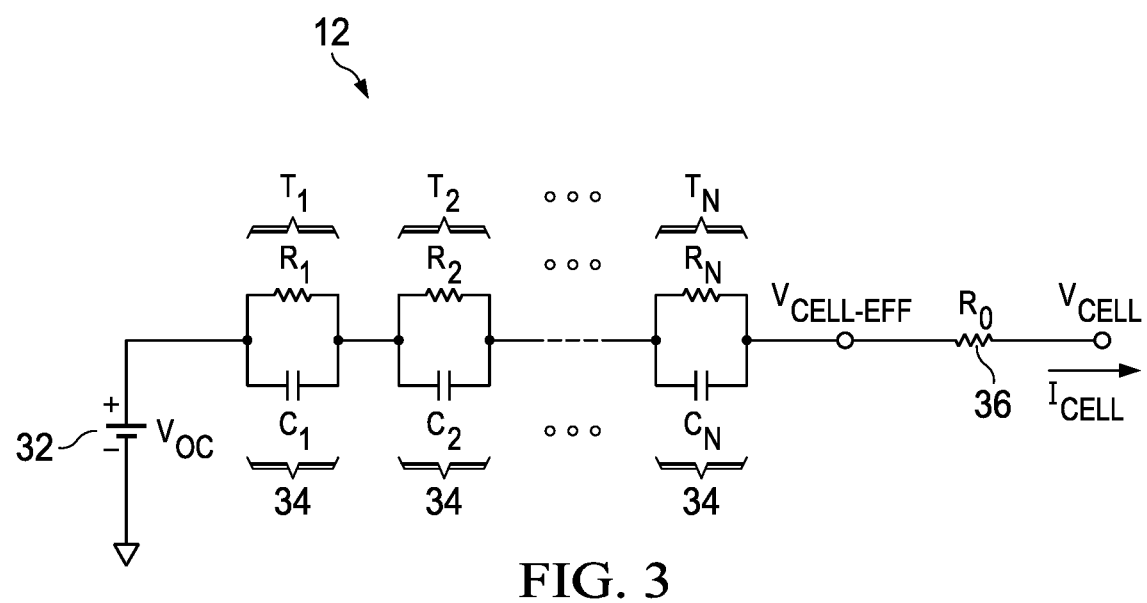
FIG. 3 illustrates a block diagram of selected components of an equivalent circuit model for a battery, in accordance with embodiments of the present disclosure.

FIG. 3 illustrates a block diagram of selected components of an equivalent circuit model for battery 12, in accordance with embodiments of the present disclosure. As shown in FIG. 3, battery 12 may be modeled as having a battery cell 32 having an open circuit voltage $V_{OC}$ in series with a plurality of parallel resistive-capacitive sections 34 and further in series with an equivalent series resistance 36 of battery 12, such equivalent series resistance 36 having a resistance of $R_0$. Resistances $R_1, R_2, \ldots R_N$ and respective capacitances $C_1, C_2, \ldots, C_N$ may model battery chemistry-dependent time constants $\tau_1, \tau_2, \ldots, \tau_N$, that may be lumped with open circuit voltage $V_{OC}$ and equivalent series resistance 36. Notably, an electrical node depicted with voltage $V_{CELL-EFF}$ in FIG. 3 captures the time varying discharge behavior of battery 12, and battery voltage $V_{CELL}$ is an actual voltage seen at the output terminals of battery 12. Voltage $V_{CELL-EFF}$ may not be directly measurable, and thus battery voltage $V_{CELL}$ may be the only voltage associated with battery 12 that may be measured to evaluate battery state of health. Also of note, at a current draw of zero (e.g., $I_{CELL}=0$), battery voltage $V_{CELL}$ may be equal to voltage $V_{CELL-EFF}$ which may in turn be equal to an open circuit voltage $V_{OC}$ at a given state of charge.

Figure 4:
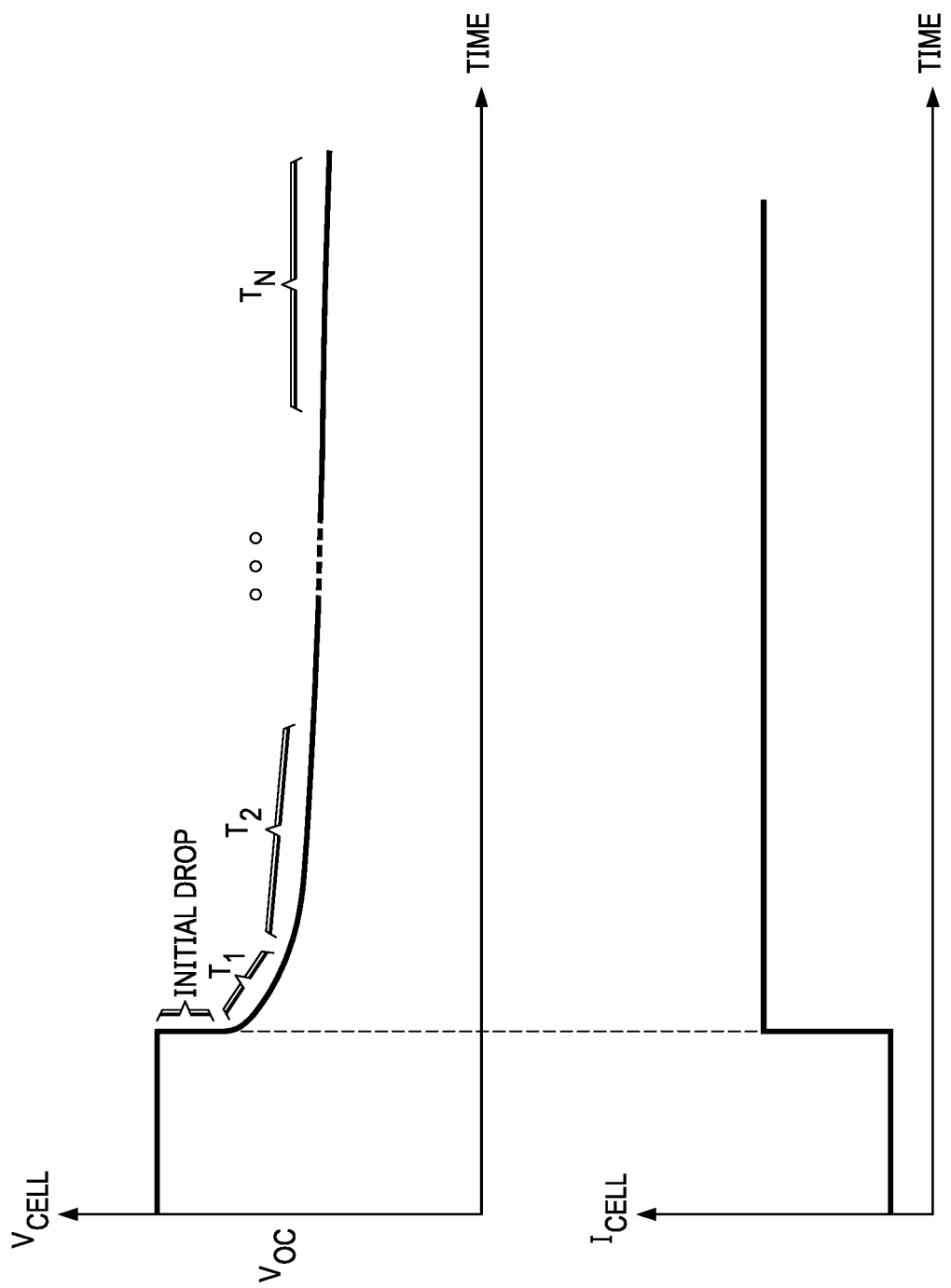
FIG. 4 illustrates an example graph of a battery voltage and a battery current versus time associated with a current step drawn from a battery, in accordance with embodiments of the present disclosure.

FIG. 4 illustrates example graphs of battery voltage $V_{CELL}$ and battery current $I_{CELL}$ versus time associated with a current step drawn from battery 12, in accordance with embodiments of the present disclosure. As shown in FIG. 4, in response to a current step event, battery voltage $V_{CELL}$ may respond to the step, as the response curve for battery voltage $V_{CELL}$ experiences an initial instantaneous drop (e.g., due to equivalent series resistance 36) and time-dependent voltage drops due to time constants $\tau_1, \tau_2, \ldots, \tau_N$. Open circuit voltage $V_{OC}$ and the various impedances $R_0, R_1, R_2, \ldots R_N$, may be a function of state of charge of battery 12, thus implying that a transient response to a new, fully-charged battery could be significantly different from that of an aged, partially-discharged battery.

In operation, control circuitry 30 may determine a maximum battery current $I_{CELL}$ that may be drawn from battery 12 at any given instant based on one or more constraints, including protection of battery 12, stability of power converter 20, and/or limitations associated with practical limitations.

Figure 5:
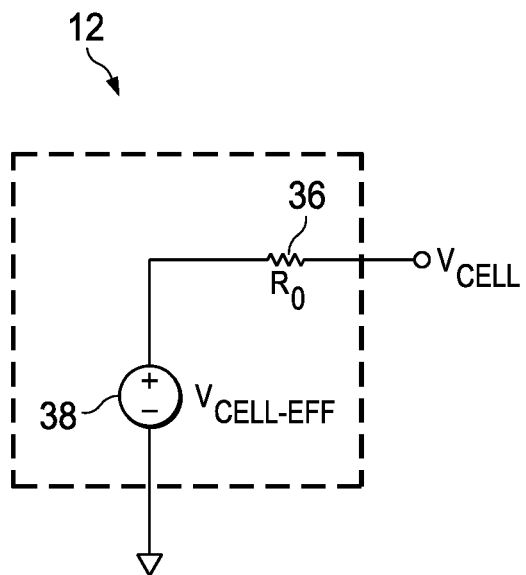
FIG. 5 illustrates an example first-order model of a battery simplified to a time-varying voltage source in series with an equivalent series resistance, in accordance with embodiments of the present disclosure.

A first constraint that may be imposed by control circuitry 30 is battery-imposed limitations for the maximum of battery current $I_{CELL}$. To illustrate application of this constraint, FIG. 5 illustrates an example first-order model of battery 12 simplified to a time-varying voltage source 38 with voltage $V_{CELL-EFF}$ in series with equivalent series resistance 36 having a resistance value of $R_0$, in accordance with embodiments of the present disclosure. A maximum battery current $I_{CELL-MAX}$ that battery 12 may be capable of delivering may be directly dependent on equivalent series resistance 36. Battery current $I_{CELL}$ must pass through equivalent series resistance 36, which may reduce battery voltage $V_{CELL}$ from voltage $V_{CELL-EFF}$ by an amount equal to resistance $R_0$ multiplied by battery current $I_{CELL}$ (e.g., $V_{CELL}=V_{CELL-EFF}-R_0 I_{CELL}$). Perhaps more significantly, battery current $I_{CELL}$ flowing through equivalent series resistance 36 may cause power dissipation within battery 12 that is equal to resistance $R_0$ multiplied by the square of battery current $I_{CELL}$ (e.g., $P=R_0 I_{CELL}^2$). At high rates of discharge, battery current $I_{CELL}$ may lead to significant heating within battery 12. The requirement discussed above that battery voltage $V_{CELL}$ must remain above end-of-discharge voltage $V_{CELL-MIN}$ sets a limitation on maximum battery current $I_{CELL-MAX}$, as given by:

$$I_{CELL-MAX} = \frac{V_{CELL-EFF} - V_{CELL-MIN}}{R_0}$$

Figure 6:
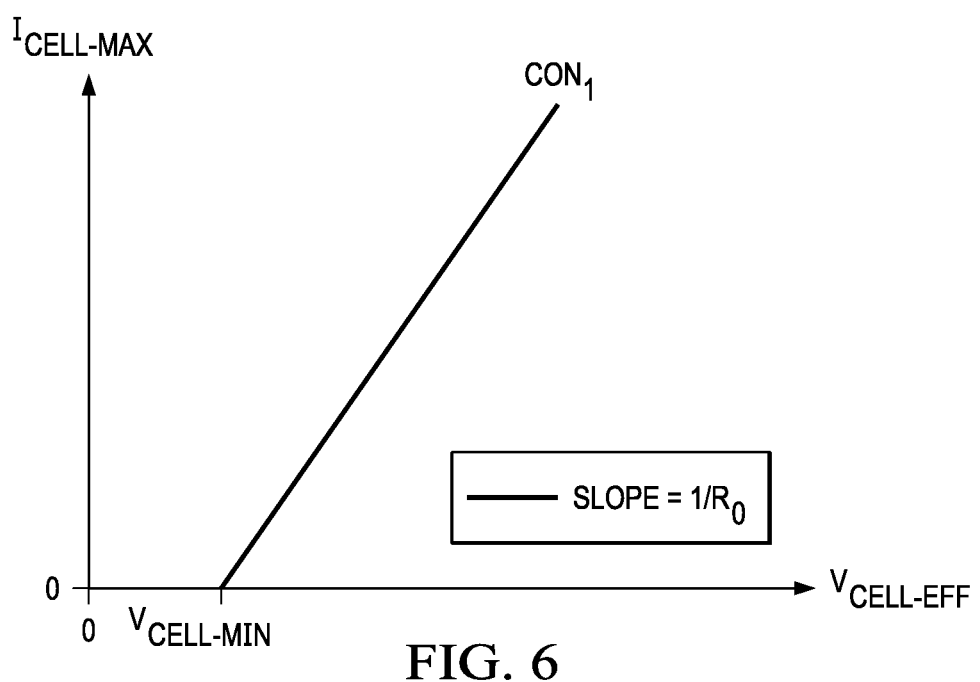
FIG. 6 illustrates an example graph of a maximum battery current versus an internal effective battery voltage for battery protection, in accordance with embodiments of the present disclosure.

Accordingly, maximum battery current $I_{CELL-MAX}$ may be a function of voltage $V_{CELL-EFF}$, assuming only battery-imposed limitations, and may be plotted as illustrated by line CON1 shown in FIG. 6.

To enforce such limitation, control circuitry 30 may implement an active protection scheme to ensure that end-of-discharge voltage $V_{CELL-MIN}$ is not violated, despite transient loads on power converter 20, so as to avoid damage to battery 12. For example, control circuitry 30 may be configured to monitor battery voltage $V_{CELL}$ at terminals of battery 12 and vary maximum battery current $I_{CELL-MAX}$ drawn by power converter 20 as shown by constraint CON1 in FIG. 6 in order to ensure battery 12 is not over-discharged to push beyond its safe operating range, in order to extend life of battery 12. However, complicating such control of maximum battery current $I_{CELL-MAX}$ is that the transient response of battery 12 may be a function of multiple time constants (e.g., $\tau_1, \tau_2, \ldots, \tau_N$) as described above, and it may be unfeasible or uneconomical to measure such time constants for a given battery and vary maximum battery current $I_{CELL-MAX}$ in a feedforward manner Thus, as further described below, control circuitry 30 may implement a negative feedback control loop around power converter 20 that may monitor battery voltage $V_{CELL}$ and vary maximum battery current $I_{CELL-MAX}$ to maintain battery voltage $V_{CELL}$ at a desired target value.

Figure 7:
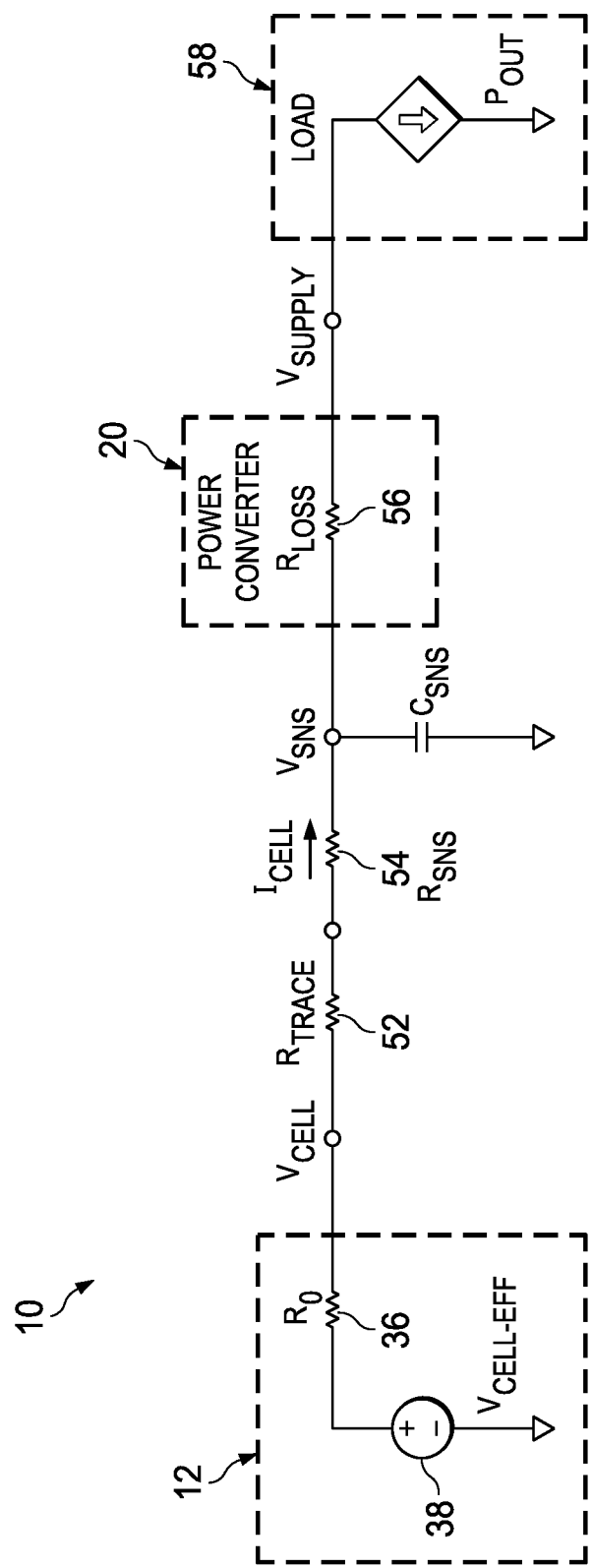
FIG. 7 illustrates a block diagram of example selected impedances within the power delivery network shown in FIG. 1, in accordance with embodiments of the present disclosure.

In addition to limiting current to provide for protection of battery 12 as described above, it may also be desirable to limit current to provide stability for power converter 20, in order to operate beyond a maximum power point into a region of instability of power converter 20, as described in greater detail below. To illustrate, reference is made to FIG. 7, which depicts a detailed block diagram of selected impedances within power delivery network 10 shown in FIG. 1, in accordance with embodiments of the present disclosure. As shown in FIG. 7, power delivery network 10 may be modeled with battery 12 as shown in FIG. 5 in series with a trace resistor 52, a current sense resistor 54, an impedance 56 to model equivalent losses in power converter 20, and a load 58 representing the aggregate of downstream devices 18. Trace resistor 52 may have a resistance $R_{TRACE}$ representing a resistance of electrical conduit between battery 12 and power converter 20 (e.g., a connector, printed circuit board trace, etc.). Sense resistor 54 may have a resistance $R_{SNS}$ and may be used to sense battery current $I_{CELL}$ based on a voltage drop across sense resistor 54 and resistance $R_{SNS}$ in accordance with Ohm's law. Impedance 56 may model losses inside power converter 20 with resistance $R_{LOSS}$. After accounting for power losses occurring in these various impedances, power converter 20 may deliver output power $P_{OUT}$ to load 58, given as:

$$P_{OUT}=I_{CELL}V_{CELL-EFF}-I_{CELL}^2 R_{TOT}$$

where $$R_{TOT}=R_0+R_{TRACE}+R_{SNS}+R_{LOSS}$$

Figure 8:
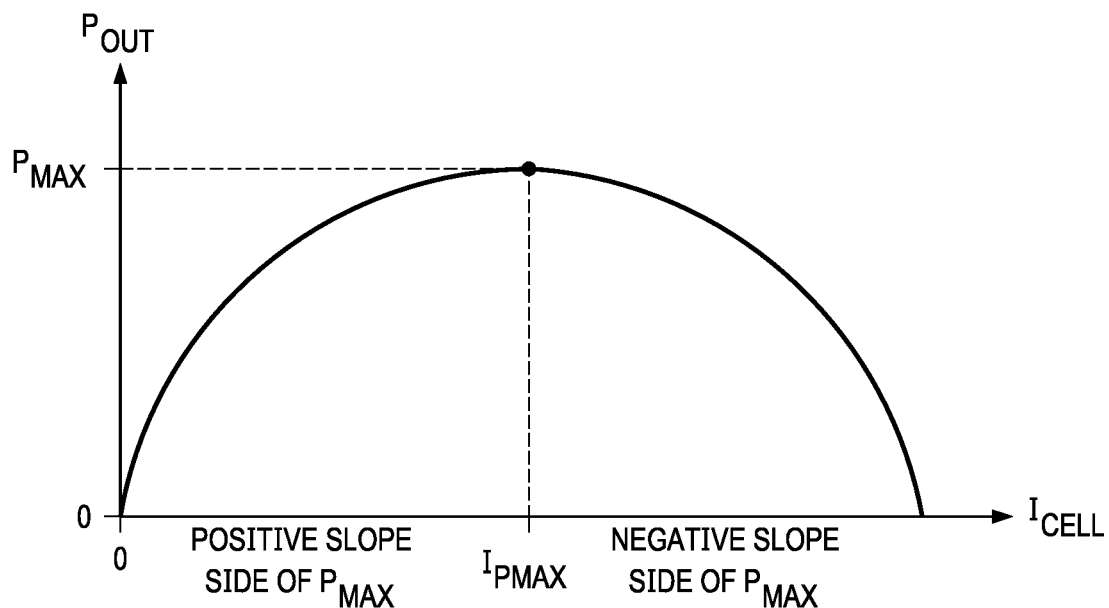
FIG. 8 illustrates an example graph of an output power of a power converter versus battery current drawn by the power converter, in accordance with embodiments of the present disclosure.

For a given total resistance $R_{TOT}$ and given voltage $V_{CELL-EFF}$, there may exist a maximum power $P_{MAX}$ for output power $P_{OUT}$ of power delivery network 10 as a function of battery current $I_{CELL}$ that occurs at a current $I_{PMAX}$, as shown in FIG. 8, where current $I_{PMAX}$ may be given by:

$$I_{PMAX} = \frac{V_{CELL-EFF}}{2R_{TOT}}$$

Figure 9:
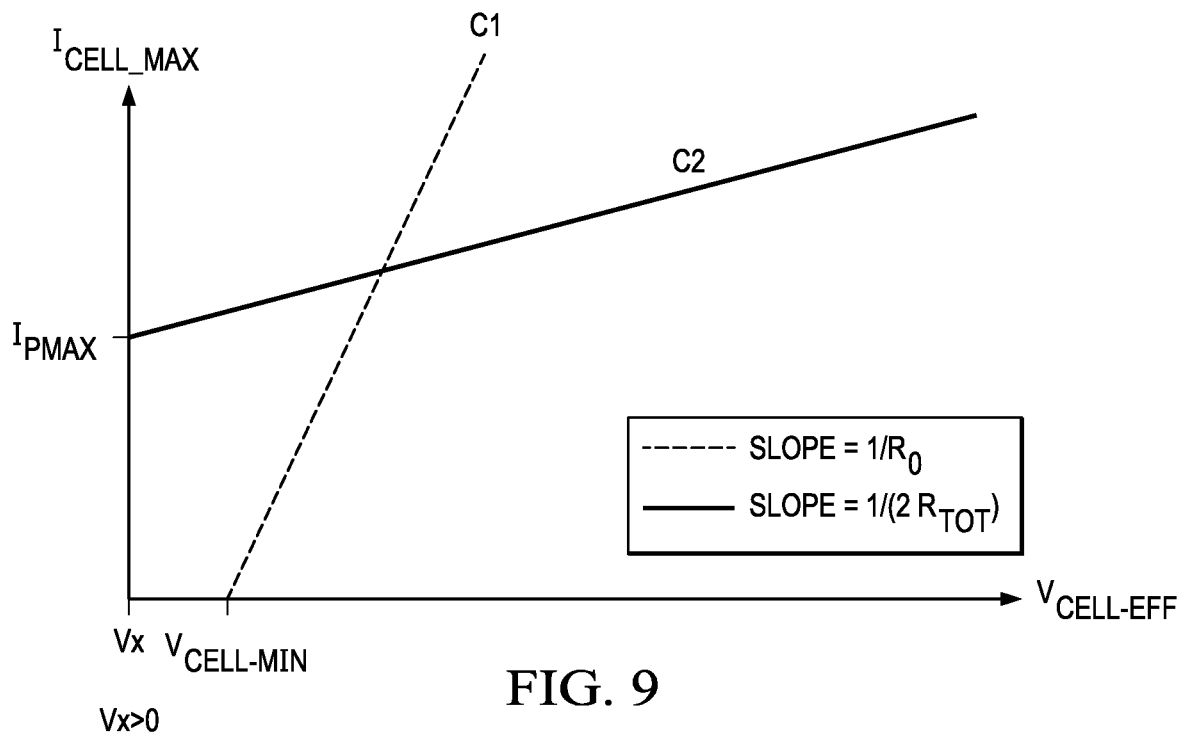
FIG. 9 illustrates an example graph of a maximum battery current versus an internal effective battery voltage for power converter stability, in accordance with embodiments of the present disclosure.

Thus, it is shown from FIG. 8 that power delivery system 10 will operate with optimum power efficiency and stability if $I_{CELL}<I_{PMAX}$, and will operate in a region of instability (negative slope of output power $P_{OUT}$ versus battery current $I_{CELL}$) when $I_{CELL}>I_{PMAX}$. This maximum allowable current $I_{PMAX}$ may be plotted as shown in FIG. 9 as constraint CON2 superimposed over constraint CON1 for maximum battery current $I_{CELL-MAX}$ depicted in FIG. 6. Because total resistance $R_{TOT}$ is greater than equivalent series resistance $R_0$, it may be evident that the slope of constraint CON1 is steeper than the slope of constraint CON2. On extrapolation, the line of constraint CON2 may intercept the horizontal axis of voltage $V_{CELL-EFF}$ at 0 V, which is not shown in FIG. 9, as many batteries (e.g., lithium-ion batteries) will not be allowed to drop to such magnitude.

For high-efficiency power converters, impedance 56 may be negligible compared to equivalent series resistance 36, trace resistor 52, and sense resistor 54, such that total resistance $R_{TOT}$ may be rewritten as:

$$R_{TOT} \approx R_0+R_{TRACE}+R_{SNS}$$

As battery 12 is discharged with use, equivalent series resistance 36 may increase and voltage $V_{CELL-EFF}$ may decrease accordingly. Therefore, maximum allowable current $I_{PMAX}$ corresponding to maximum power $P_{MAX}$ may be a function of voltage $V_{CELL-EFF}$ and impedances of power delivery network 10.

In addition to limiting current to provide for protection of battery 12 as described above, and in addition to limiting current to provide stability for power converter 20 as described above, it may also or alternatively be desirable to limit current based on considerations of practical implementations, as described in greater detail below.

As an example, beyond a certain voltage $V_{CELL\text{-}EFF}$, the maximum battery current $I_{CELL}$, and therefore the maximum power delivery capability $P_{MAX}$, of power converter 20 may become so large that the design of power converter 20 becomes increasingly difficult or even unfeasible. Practical limitations such as, for example, inductor saturation current and required dynamic range of current sensing circuitry in power converter 20 may dictate an upper power limit $P_{LIM}$ be placed on output power $P_{OUT}$. Thermal considerations may also need to be taken into consideration and may drive a need to limit maximum power delivery from power converter 20.

Assuming output power $P_{OUT}$ is limited to power limit $P_{LIM}$, a power balance equation for power delivery system 10 may be written as:

$$I_{CELL}^2 R_{TOT} - I_{CELL} V_{CELL\text{-}EFF} + P_{LIM} = 0$$

which can be rewritten as:

$$I_{CELL\text{-}LIM} = I_{PMAX} - \sqrt{\frac{P_{MAX} - P_{LIM}}{R_{TOT}}}$$

Figure 10:
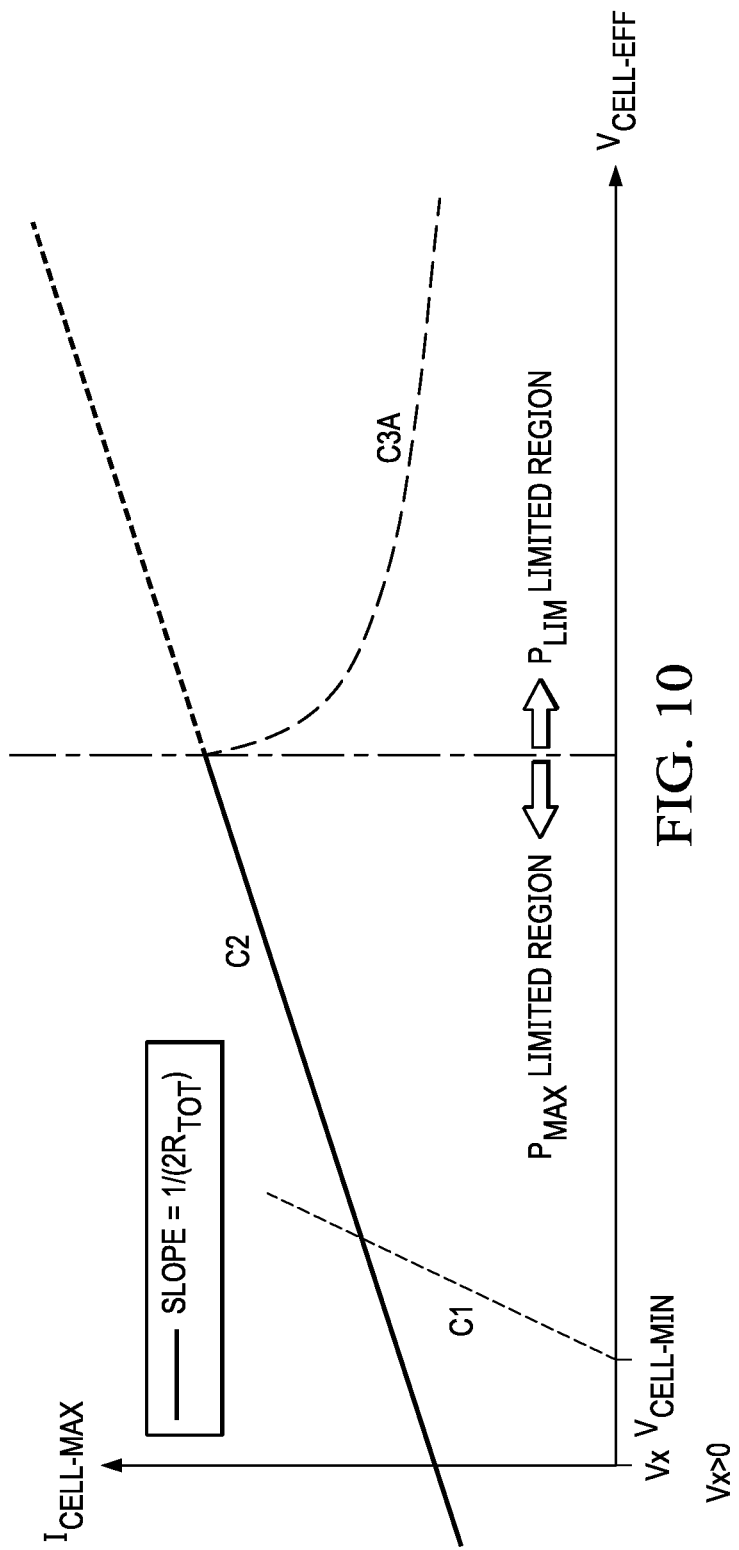
FIG. 10 illustrates an example graph of a maximum battery current versus an internal effective battery voltage for power limit considerations, in accordance with embodiments of the present disclosure.

This maximum allowable current $I_{CELL\text{-}LIM}$ may be plotted as shown in FIG. 10 as constraint CON3A superimposed over constraints CON1 and CON2 depicted in FIG. 9. A separation between two power limited regions for $P_{MAX}$ and $P_{LIM}$ are graphically shown in FIG. 10 as occurring at a breakpoint between the curves representing constraints CON2 and CON3A. In the region limited by power limit $P_{LIM}$, a maximum for battery current $I_{CELL}$ may be set by the lower of the two values for maximum allowable current. As is shown in FIG. 10, along the curve for constraint CON3A, the maximum current for battery current $I_{CELL}$ may increase as voltage $V_{CELL\text{-}EFF}$ decreases.

Figure 11:
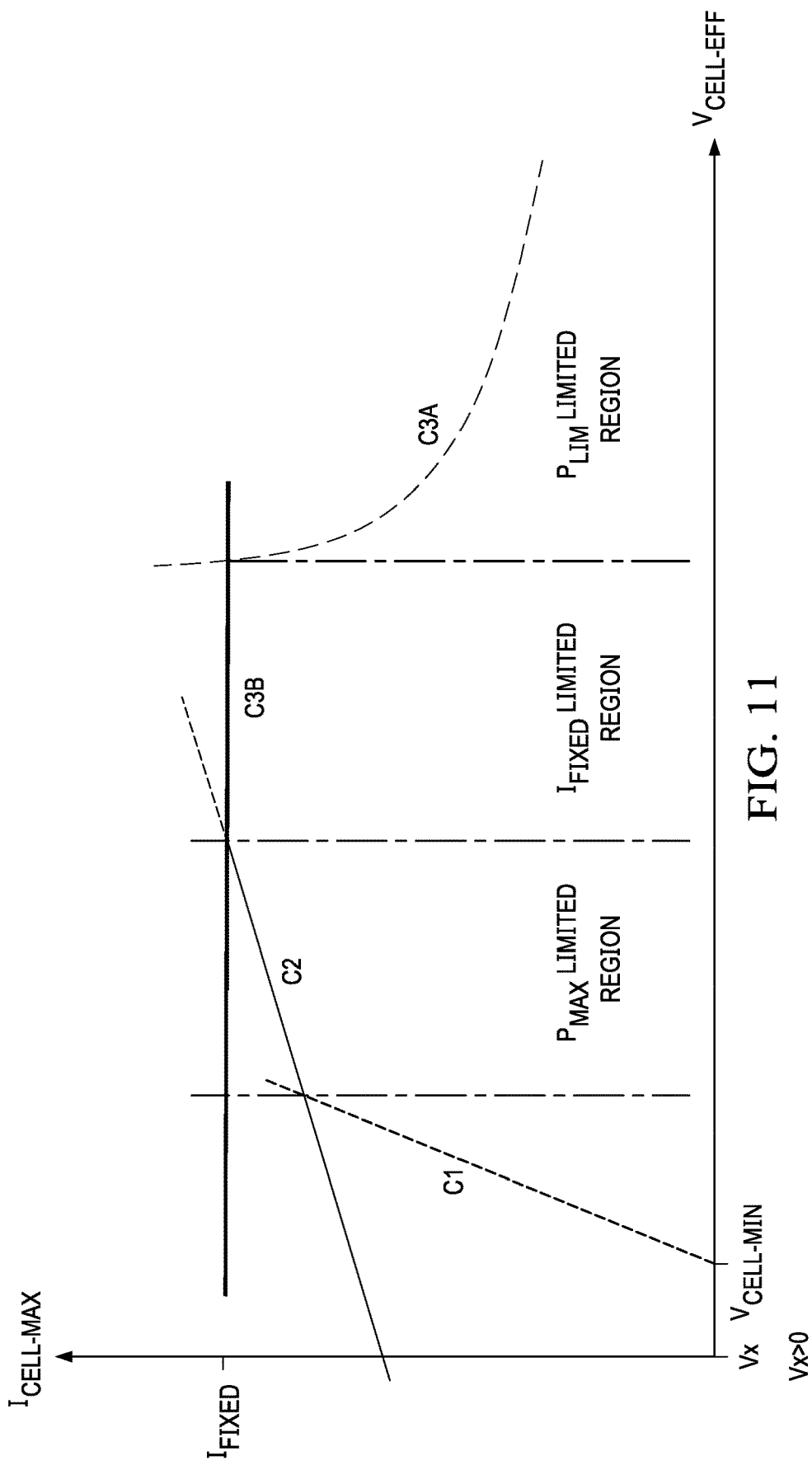
FIG. 11 illustrates an example graph of a maximum battery current versus an internal effective battery voltage for current limit considerations, in accordance with embodiments of the present disclosure.

In addition to limiting current to provide for protection of battery 12 as described above, limiting current to provide stability for power converter 20 as described above, and limiting current for power limiting considerations, it may also or alternatively be desirable to apply a fixed current limit $I_{FIXED}$ based on considerations of practical implementations, as described in greater detail below. This maximum allowable current $I_{FIXED}$ may be plotted as shown in FIG. 11 as constraint CON3B superimposed over constraints CON1, CON2, and CON3A depicted in FIG. 10. Thus the maximum current for battery current $I_{CELL}$ may be set by the lowest of the four values for maximum allowable current.

In the description above, the various active protection mechanisms each protect power converter 20 and its respective system modules (e.g., battery 12, downstream components 18, etc.) and each mechanism operates independently from the other.

However, all of the mechanisms may act using a shared control parameter: maximum battery current $I_{CELL\text{-}MAX}$. This shared control parameter may result from the fact that the current limit for power converter 20 and active protection mechanisms must be dynamically updated during operation to account for characteristics of battery 12 (e.g., open circuit voltage $V_{OC}$, voltage $V_{CELL\text{-}EFF}$, resistance $R_0$), module-level considerations (e.g., resistance $R_{TRACE}$), and efficiency of power converter 20 (e.g., as modeled by resistance $R_{LOSS}$). At any given instance, maximum battery current $I_{CELL\text{-}MAX}$ drawn from battery 12 may be given by the minimum of the mechanisms that set maximum battery current $I_{CELL\text{-}MAX}$. It may therefore be advantageous to provide active protection mechanisms that may:

track key system parameters (e.g., effective battery voltage $V_{CELL\text{-}EFF}$, output power $P_{OUT}$) on the fly and adjust maximum battery current $I_{CELL\text{-}MAX}$ accordingly;

adjust maximum battery current $I_{CELL\text{-}MAX}$ in a timely fashion; and/or smoothly hand off control between each of the active protection mechanisms over the entire operational range of effective battery voltage $V_{CELL\text{-}EFF}$.

Accordingly, to obtain these advantages, when battery voltage $V_{CELL}$ approaches end-of-discharge voltage $V_{CELL\text{-}MIN}$, battery protection of constraint CON1 may include a mechanism that limits battery current $I_{CELL}$ so that droop of battery voltage $V_{CELL}$ may be arrested. Because impedance of battery 12 varies with its state of charge, such current limit may need to be dynamic. Thus, it is possible that when such a protection scheme kicks in, supply voltage $V_{SUPPLY}$ could drop below its target desired level, due to the fact that power converter 20 is itself current-starved.

One possible approach is to set a threshold for a cut-off circuit that is higher than the actual end-of-discharge voltage $V_{CELL\text{-}MIN}$. While such an approach may protect battery 12, it may not allow access of all energy of battery 12 that may be safely utilized. Another possible approach is to use an analog-to-digital converter (ADC) to constantly monitor battery voltage $V_{CELL}$ and trigger a cut-off circuit when battery voltage $V_{CELL}$ decreases to end-of-discharge voltage $V_{CELL\text{-}MIN}$. However, while potentially providing high accuracy, an approach using an ADC may require significant time for conversion and may not be able to respond to fast transient loads. If a faster response time is desired, a high-speed ADC may be used. However, such a high-speed ADC may consume a large amount of power not suitable for portable, battery-powered applications.

Another possible approach is to use a single comparator and a reactive loop that maintains battery voltage $V_{CELL}$ at about end-of-discharge voltage $V_{CELL\text{-}MIN}$ by actively throttling the current limit of power converter 20 and therefore limiting maximum battery current $I_{CELL\text{-}MAX}$. Such approach is disclosed in U.S. Pat. No. 10,720,835 (hereinafter, the '835 patent), which is incorporated by reference herein in its entirety. However, such a single-threshold scheme may also have disadvantages. To illustrate, consider a capacitance $C_{SNS}$ present at the electrical node for sense voltage $V_{SNS}$ in FIG. 7, and consider that such capacitance may vary between two capacitance values, for example due to aging of components of power delivery network 10. For the same load step, the slew rate on battery voltage $V_{CELL}$ may vary inversely with such capacitance. When battery voltage $V_{CELL}$ falls below a set threshold, the comparator of such approach may be set, and such setting of the comparator may initiate a lowering (attack) of a current limit for power converter 20. However, in practice, the comparator delay and processing time are non-zero. During such non-zero time interval, the droop in battery voltage $V_{CELL}$ may be unchecked and may be proportional to the slew rate associated with the capacitance present on the electrical node for sense voltage $V_{SNS}$. Accordingly, the droop in battery voltage $V_{CELL}$ may be higher for lower capacitances, and power converter 20 has no control over such droop. Such initial droop may be significant and may raise a false alarm and unnecessarily trigger more stringent protection schemes (e.g., shutting down the system). Further, repeated voltage dips significantly below the comparator threshold may defeat the purpose of using such a protection scheme in the first place.

Figure 12:
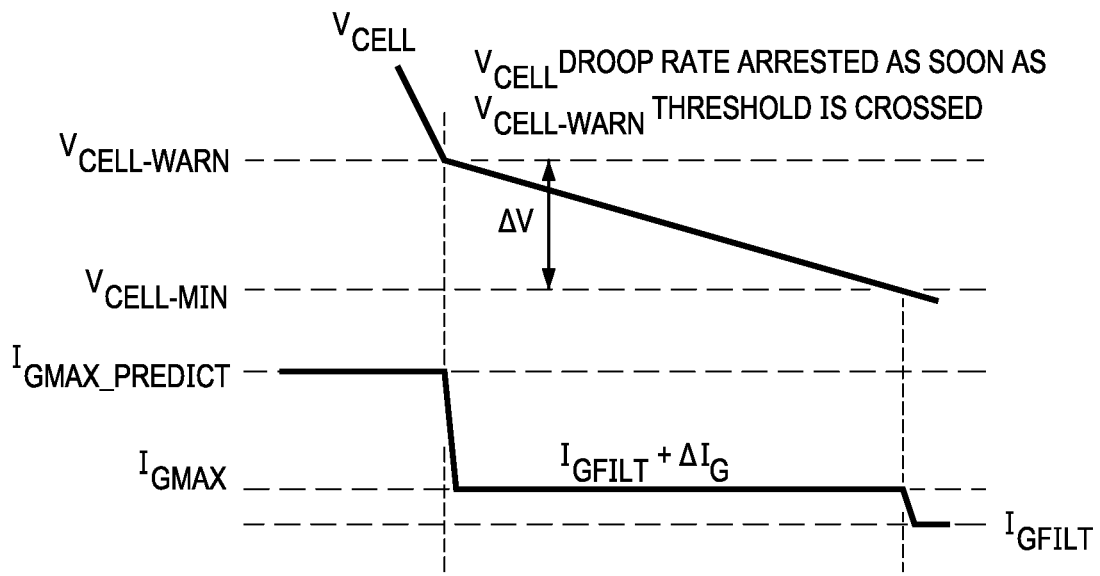
FIG. 12 illustrates an example graph of a battery voltage versus time and maximum current drawn by a power converter versus time, in accordance with embodiments of the present disclosure.

To overcome such disadvantages, control circuitry 30 may be further configured to implement two voltage thresholds for power delivery network 10: a critical threshold voltage based on end-of-discharge voltage $V_{CELL\text{-}MIN}$ and a warning threshold voltage $V_{CELL\text{-}WARN}$ greater than the critical threshold voltage. Control circuitry 30 may be configured to, when battery voltage $V_{CELL}$ falls below warning threshold voltage $V_{CELL\text{-}WARN}$, decrease a maximum power converter current $I_{GMAX}$ for a current $I_G$ ($I_G=I_{CELL}$ if power converter 20 is the only load to battery 12) drawn by power converter 20 from a predicted maximum current level $I_{GMAX\_PREDICT}$ to a first current level $I_{GFILT}+\Delta I_G$, as shown in FIG. 12. The value $\Delta I_G$ may be calculated on a voltage difference $\Delta V=V_{CELL\text{-}WARN}-V_{CELL\text{-}MIN}$ and resistance $R_0$ (e.g., $\Delta I_G=\Delta V/R_0$). Thus, when warning threshold voltage $V_{CELL\text{-}WARN}$ is crossed, an amount of voltage headroom above end-of-discharge voltage $V_{CELL\text{-}MIN}$ is known and available before end-of-discharge voltage $V_{CELL\text{-}MIN}$ is reached. The value $\Delta I_G$ may be stored as a programmable value and may be set based on factory characterization, in-situ characterization, and/or any other appropriate manner.

To circumvent latency associated with sensing current across sense resistor 54, control circuitry 30 may generate a measured filtered current $I_{GFILT}$ that emulates a total average current $I_G$ drawn by power converter 20 from battery 12 filtered by capacitance $C_{SNS}$ and a combined resistance $R_0+R_{TRACE}+R_{SNS}$. To perform such filtering, control circuitry 30 may implement a digital filter tuned to have a transfer function with a pole that is always greater than $1/(R_0+R_{TRACE}+R_{SNS})C_{SNS}$. Such calculation thus inherently accounts for the capacitance $C_{SNS}$.

Further, as shown in FIG. 12, when battery voltage $V_{CELL}$ falls below end-of-discharge voltage $V_{CELL\text{-}MIN}$, maximum battery current $I_{CELL\text{-}MAX}$ decreases from first current level $I_{FILT}+\Delta I$ to a second current level equal (or approximately equal) to measured filtered current $I_{FILT}$. In some embodiments, the second current level may be measured filtered current $I_{FILT}$ multiplied by a gain factor which is greater than 1.

Figure 13:
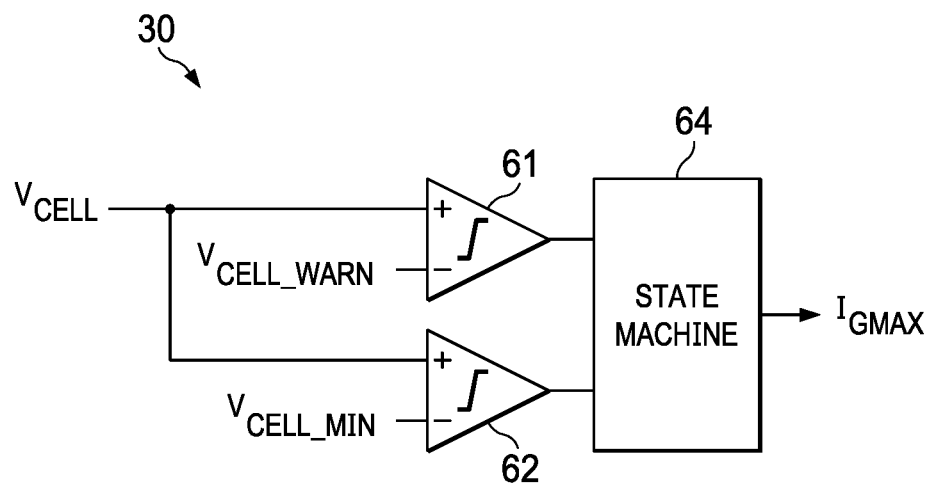
FIG. 13 illustrates an example block diagram of selected components of a control circuit that may be used to implement a dual-threshold protection mechanism, in accordance with embodiments of the present disclosure.

FIG. 13 illustrates an example block diagram of selected components of control circuit 30 that may be used to implement the dual-threshold protection mechanism described above, in accordance with embodiments of the present disclosure. As shown in FIG. 13, a comparator 61 may compare battery voltage $V_{CELL}$ to warning threshold voltage $V_{CELL\text{-}WARN}$ and a comparator 62 may compare battery voltage $V_{CELL}$ to end-of-discharge voltage $V_{CELL\text{-}MIN}$. The outputs of comparators 61 and 62 may be received by a state machine 64 that may generate a maximum power converter current $I_{GMAX}$ based on the outputs of comparators 61 and 62, as described in greater detail below. Maximum power converter current $I_{GMAX}$ may be used by switch control circuitry of control circuit 30 to control switching of switches internal to power converter 20 in order to limit current drawn by power converter 20 to such maximum power converter current $I_{GMAX}$.

Further, state machine 64 may be configured to create differing release rates for maximum power converter current $I_{GMAX}$ when merged with the attack/release scheme of the '835 patent. For example, state machine 64 may release (e.g., increase) maximum power converter current $I_{GMAX}$ once a load transient has passed, allowing maximum power converter current $I_{GMAX}$ to return to predicted maximum current level $I_{GMAX\_PREDICT}$. In some embodiments, two release rates may be provided by state machine 64. One release rate may be that as described in the '835 patent. A second release rate may be applied by state machine 64 once battery voltage $V_{CELL}$ has again increased above warning threshold voltage $V_{CELL\text{-}WARN}$. This second release rate may allow for additional tuning and response time and current (and therefore, power) profile during recovery of power converter 20.

Figure 14:
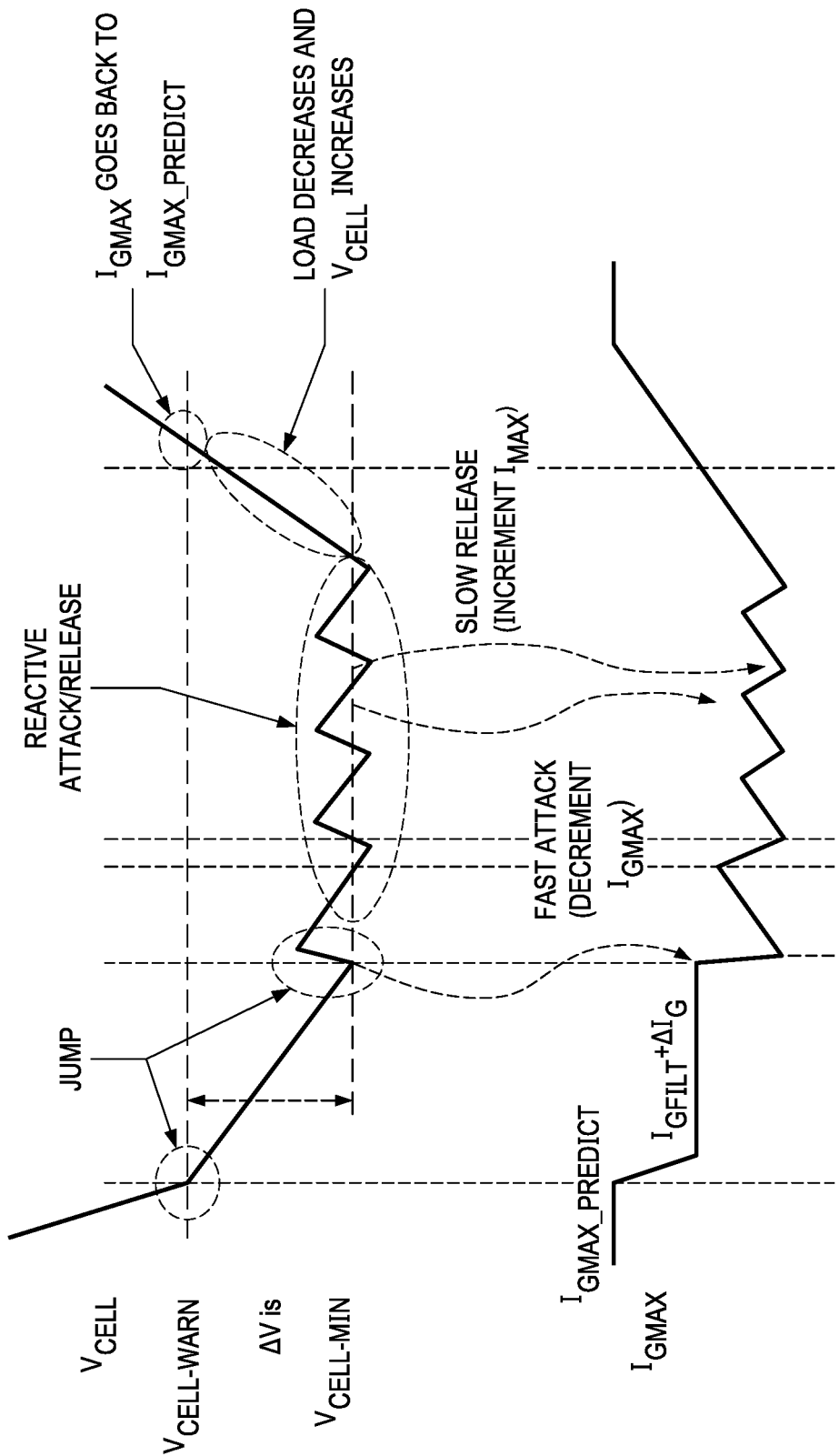
FIG. 14 illustrates an example graph of a battery voltage versus time and maximum current drawn by a power converter versus time detailing a fast attack and slow release control mechanism, in accordance with embodiments of the present disclosure.
Figure 15:
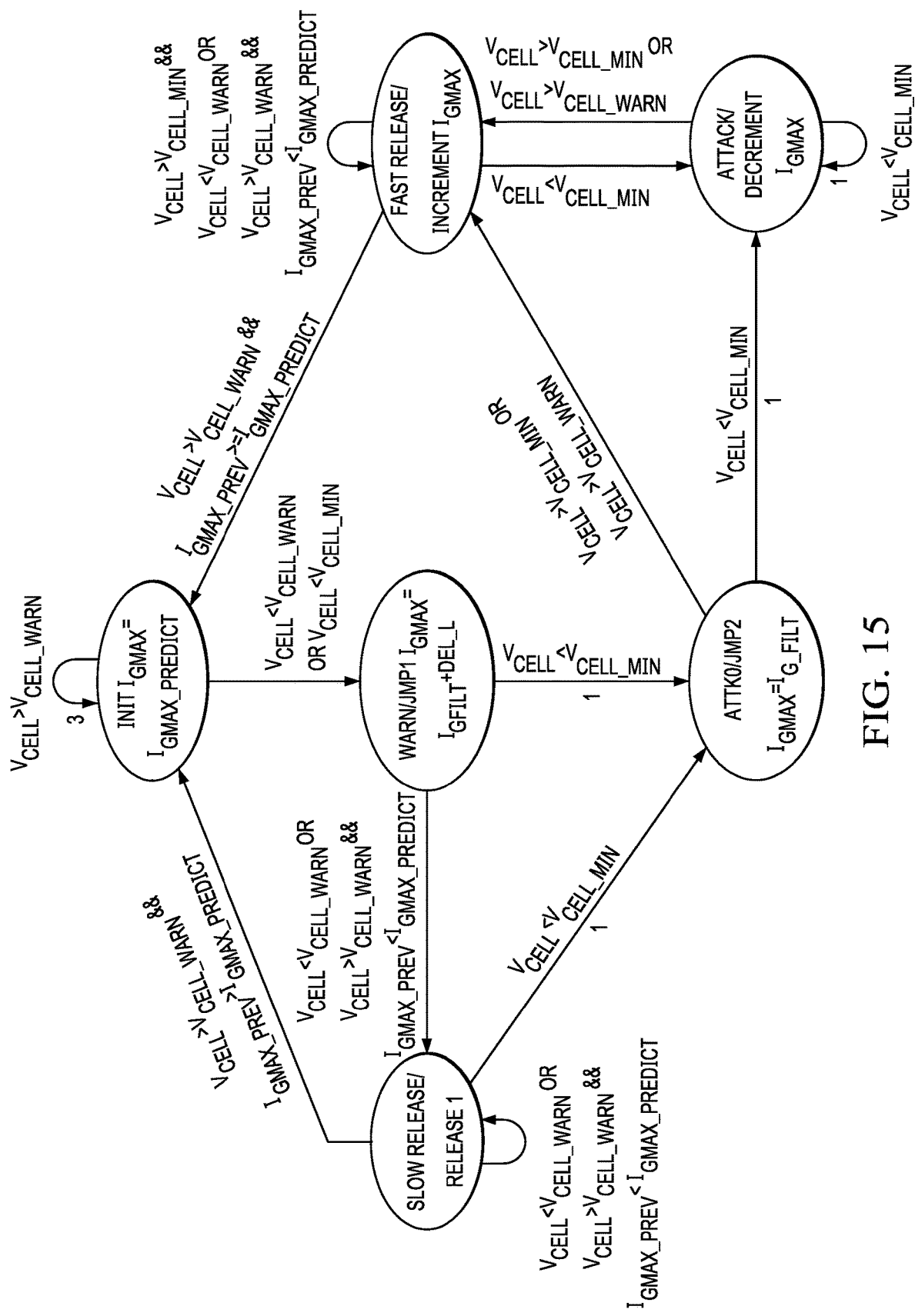
FIG. 15 illustrates a state diagram that may be implemented using the state machine shown in FIG. 13, in accordance with embodiments of the present disclosure.

FIG. 14 illustrates an example graph of battery voltage VCELL versus time and maximum power converter current $I_{GMAX}$ drawn by power converter 20 versus time detailing a fast attack and slow release control mechanism implemented by state machine 64, in accordance with embodiments of the present disclosure. Further, FIG. 15 illustrates an example state diagram that may be implemented using state machine 64 in order to implement the dual-threshold, fast attack and slow release control mechanism with two different release rates, in accordance with embodiments of the present disclosure.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power delivery system, comprising:
   a power converter configured to electrically couple to a power source and further configured to supply electrical energy to one or more loads electrically coupled to an output of the power converter; and
   control circuitry configured to:
   determine whether a voltage node in the power delivery system indicative of a terminal voltage of the power source has fallen below a warning threshold voltage;
   determine whether the voltage node has fallen below a critical threshold voltage, wherein the critical threshold voltage is lesser than the warning threshold voltage;
   in response to a voltage of the voltage node falling below the warning threshold voltage, decrease a maximum current drawn by the power converter from a first current level to a second current level; and
   in response to a voltage of the voltage node falling below the critical threshold voltage, decrease a maximum current drawn by the power converter from the second current level to a third current level greater than zero.

2. The power delivery system of claim 1, wherein the control circuitry is further configured to, after the voltage of the voltage node has fallen below the critical threshold voltage, decrease the maximum current drawn by the power converter until the voltage of the voltage node rises above the critical threshold voltage.

3. The power delivery system of claim 2, wherein the control circuitry is further configured to, after the voltage of the voltage node has fallen below the critical threshold voltage and increased again above the critical threshold voltage, increase the maximum current drawn by the power converter until the voltage of the voltage node again falls below the critical threshold voltage.

4. The power delivery system of claim 3, wherein the control circuitry is further configured to repeat the steps of decreasing the maximum current drawn and increasing the maximum current drawn to maintain operation of the power delivery system in a steady state.

5. The power delivery system of claim 2, wherein the control circuitry is further configured to, after the voltage of the voltage node has fallen below the critical threshold voltage and increased again above the critical threshold voltage, increase the maximum current drawn by the power converter until the voltage of the voltage node again falls below the critical threshold voltage or the maximum current drawn returns to the first voltage level.

6. The power delivery system of claim 1, wherein the power delivery system further comprises a battery from which the power converter draws current, and the critical threshold voltage is based on an end-of-discharge voltage of the battery.

7. The power delivery system of claim 6, wherein the voltage of the voltage node measures a terminal voltage of the battery.

8. The power delivery system of claim 1, wherein the control circuitry is configured to generate the third current level to emulate a total average current drawn by the power converter filtered by impedances seen at the input of the power converter.

9. A method comprising, in a power delivery system having a power converter configured to electrically couple to a power source and further configured to supply electrical energy to one or more loads electrically coupled to an output of the power converter:
   determining whether a voltage node in the power delivery system indicative of a terminal voltage of the power source has fallen below a warning threshold voltage;
   determining whether the voltage node has fallen below a critical threshold voltage, wherein the critical threshold voltage is lesser than the warning threshold voltage;
   in response to a voltage of the voltage node falling below the warning threshold voltage, decreasing a maximum current drawn by the power converter from a first current level to a second current level; and
   in response to a voltage of the voltage node falling below the critical threshold voltage, decreasing a maximum current drawn by the power converter from the second current level to a third current level greater than zero.

10. The method of claim 9, further comprising decreasing the maximum current drawn by the power converter until the voltage of the voltage node rises above the critical threshold voltage after the voltage of the voltage node has fallen below the critical threshold voltage.

11. The method of claim 10, further comprising increasing the maximum current drawn by the power converter until the voltage of the voltage node again falls below the critical threshold voltage after the voltage of the voltage node has fallen below the critical threshold voltage and increased again above the critical threshold voltage.

12. The method of claim 11, repeating the steps of decreasing the maximum current drawn and increasing the maximum current drawn to maintain operation of the power delivery system in a steady state.

13. The method of claim 10, further comprising increasing the maximum current drawn by the power converter until the voltage of the voltage node again falls below the critical threshold voltage or the maximum current drawn returns to the first voltage level after the voltage of the voltage node has fallen below the critical threshold voltage and increased again above the critical threshold voltage.

14. The method of claim 9, wherein the power delivery system further comprises a battery from which the power converter draws current, and the critical threshold voltage is based on an end-of-discharge voltage of the battery.

15. The method of claim 14, wherein the voltage of the voltage node measures a terminal voltage of the battery.

16. The method of claim 9, further comprising generating the third current level to emulate a total average current drawn by the power converter filtered by impedances seen at the input of the power converter.

17. A mobile device, comprising:
    a power source;
    one or more loads;

a power converter electrically coupled to the power source and further configured to supply electrical energy to the one or more loads; and control circuitry configured to:
- determine whether a voltage node in the power delivery system indicative of a terminal voltage of the power source has fallen below a warning threshold voltage;
- determine whether the voltage node has fallen below a critical threshold voltage, wherein the critical threshold voltage is lesser than the warning threshold voltage;
- in response to a voltage of the voltage node falling below the warning threshold voltage, decrease a maximum current drawn by the power converter from a first current level to a second current level; and
- in response to a voltage of the voltage node falling below the critical threshold voltage, decrease a maximum current drawn by the power converter from the second current level to a third current level greater than zero.

18. The mobile device of claim 17, wherein the control circuitry is further configured to, after the voltage of the voltage node has fallen below the critical threshold voltage, decrease the maximum current drawn by the power converter until the voltage of the voltage node rises above the critical threshold voltage.

19. The mobile device of claim 18, wherein the control circuitry is further configured to, after the voltage of the voltage node has fallen below the critical threshold voltage and increased again above the critical threshold voltage, increase the maximum current drawn by the power converter until the voltage of the voltage node again falls below the critical threshold voltage.

20. The mobile device of claim 19, wherein the control circuitry is further configured to repeat the steps of decreasing the maximum current drawn and increasing the maximum current drawn to maintain operation of the power delivery system in a steady state.

21. The mobile device of claim 17, wherein the control circuitry is further configured to, after the voltage of the voltage node has fallen below the critical threshold voltage and increased again above the critical threshold voltage, increase the maximum current drawn by the power converter until the voltage of the voltage node again falls below the critical threshold voltage or the maximum current drawn returns to the first voltage level.

22. The mobile device of claim 17, further comprising a battery from which the power converter draws current, and wherein the critical threshold voltage is based on an end-of-discharge voltage of the battery.

23. The mobile device of claim 22, wherein the voltage of the voltage node measures a terminal voltage of the battery.

24. The mobile device of claim 17, wherein the control circuitry is configured to generate the third current level to emulate a total average current drawn by the power converter filtered by impedances seen at the input of the power converter.

* * * * *